Patented July 11, 1950

2,514,508

UNITED STATES PATENT OFFICE 2,514,508

CORROSION PREVENTION

Leslie G. Nunn, Jr., Tulsa, Okla., assignor to Standard Oil Development Company, a corporation of Delaware No Drawing. Application April 5, 1947,
Serial No. 739,659

7 Claims. (Cl. 252—392)

The present invention is directed to a method for preventing corrosion in situations where a ferrous metal is in contact with aqueous fluids containing hydrogen sulphide.

In the production of oil, salt water is commonly produced concurrently with the oil. In many instances this salt water carries substantial percentages of hydrogen sulphide which may have its origin in the water or in the oil but which in any event occurs in the mixture. The production of such fluids, particularly in pumping wells, has given rise to very serious corrosion troubles which represent a very high monetary loss.

The principal object of the present invention is to provide a method for combating corrosion in lines containing ferrous metal and carrying aqueous fluids contaminated with hydrogen sulphide.

A more specific object of the present invention is the provision of cheap easily-handled inhibitors for the treatment of such lines.

Still more specifically it is an object of the present invention to inhibit corrosion in ferrous lines carrying aqueous fluids contaminated with hydrogen sulphide by mixing with such fluids a urea-formaldehyde condensation product.

The inhibitor employed according to the present invention may be any urea-formaldehyde condensation product which is soluble in water or forms colloidal suspensions in water. The urea-formaldehyde condensation product may be employed in its monomeric form but is preferably employed in the form of a polymer, particularly one containing 5 or more molecules of the monomer. The condensation product may be added to the fluid the corrosive effect of which is to be inhibited, as such, or in the form of its component parts, in which case the condensation product is formed in situ in the fluid to be inhibited. The latter procedure is the least preferable since the handling of formaldehyde constitutes a hazard which is to be avoided if possible. In following this procedure, formaldehyde may be used in its monomeric or polymeric form or in the form of a compound yielding formaldehyde under the conditions of working. The higher polymers of urea-formaldehyde condensation products which are available in solid form are the materials most preferred for the practice of the present invention. Both monomethylolurea and dimethylolurea and their polymers are embraced within the scope of the present invention. In general it may be said that the inhibiting agent employed is one containing the grouping

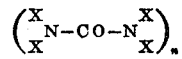

in which at least one X is a methylol group and each of the remaining X's may be one of the group consisting of hydrogen, methylol or methylene and in which $n$ may be any whole number.

The urea-formaldehyde resins are available commercially in various molecular weights. One class of such resins is known as the Uformite resins which are commonly used as adhesives and in the paper industry. These are available as thick syrupy aqueous solutions or as solids soluble or colloidally dispersible in water.

In the practice of the present invention, as it is applied to pumping wells, the inhibitor is poured at the surface into the annular space between the well casing and the producing string. In the ordinary case in which corrosion is encountered a pump will be mounted in the producing string. The action of the pump causes a surging motion of the reservoir fluid between the producing string and the casing whereby the inhibitor becomes thoroughly mixed in the reservoir fluid as it is pumped into the producing string. It will generally be sufficient to add a pound of the inhibitor for each 100 bbls. of aqueous fluid produced. In the case where the formaldehyde and urea are mixed at the surface and added as a mixture they will be mixed in equal parts by weight, based on 100% formaldehyde, and the amount of the mixture added will be such as to provide about 1 lb. of urea-formaldehyde per 100 bbls. of aqueous fluids produced. It is of course possible to use any amount of the inhibitor in excess of the amount specified, and in certain cases where the hydrogen sulphide content of the aqueous fluid is especially high, larger amounts may be required. The figure given is for the ordinary case.

When the condensation product employed is a solid, it is customary to make a slurry of it in the well fluid at the surface and dump the slurry into the annular space heretofore mentioned. It is again emphasized that in the preferred embodiment of the present invention the solid inhibitor is employed.

When the invention is practiced in surface lines carrying corrosive fluids of the character specified, the inhibitor is introduced into the line by any chemical proportioning device commonly used in such situations. In this case the content of the pipe line fluid represented by corrosive aqueous fluid is usually very small. Consequently the amout of inhibitor required is also very small. As a typical example a pipe line transporting about 30,000 bbls. of fluid per day, composed mainly of crude oil, may be properly protected by injecting into the pipe line about 5 lbs. of inhibitor every 24 hours. Let it be understood that this inhibitor will be added gradually so as to be added uniformly over a 24 hour period.

The present invention is also applicable to the protection of tanks or other vessels in which corrosive aqueous fluids of the character specified collect. In these cases the inhibitor is added to the bottom of the vessel containing the settled aqueous fluid in an amount substantially the same as that prescribed for pumping wells.

To illustrate the degree of protection afforded by the inhibitors employed according to the present invention, reference is made to tests in which test pieces of sand blasted steel in the form of plates were immersed in salt water containing about 400 pts. per million of hydrogen sulphide for a period of 7 days. In one vessel the salt water contained no inhibitor and in the other vessels the salt water contained different inhibitors. The test piece was weighed at the beginning and at the end of 7 days and the loss of weight during this period was taken as a measure of the corrosive action of the liquid.

In the blank sample the test piece weighed 16.4523 grams and at the end of 7 days it weighed 16.4442 grams, representing a loss of 8.1 milligrams.

In one vessel to which had been added a mixture of urea and formaldehyde in equal parts by weight in amounts representing ½ lb. of each per 100 bbls. of aqueous fluid the test piece initially weighed 14.6576 grams and at the end of 7 days had exactly the same weight.

In another individual vessel urea alone was added in an amount representing ½ lb. per 100 bbls. of aqueous fluid. In that case the test piece weighed 16.6187 grams at the beginning and at the end of 7 days weighed 16.6121 grams representing a loss of 6.6 milligrams. This was little better than the uninhibited solution.

In still another vessel formaldehyde was added in an amount corresponding to ½ lb. per 100 bbls. of aqueous fluid. In this case the test piece at the beginning weighed 16.4278 grams and at the end of 7 days weighed 16.4258 grams representing a loss of 2 milligrams.

In still another vessel a urea formaldehyde resin available on the market as Uformite 500 was added in the proportion of ½ lb. per 100 bbls. of aqueous fluid. This resin is a compound made from substantially equal parts of urea and formaldehyde, so that ½ lb. of this resin would ordinarily be considered equivalent to ¼ lb. of formaldehyde. In this case the test piece initially weighed 15.2989 grams and after 7 days it weighed 15.2970 grams, representing a loss of 1.9 milligrams.

In another vessel, formaldehyde was added in an amount corresponding to 1 lb. per 100 bbls. of aqueous fluid. In this case the initial test piece weighed 15.7815 grams and at the end of 7 days it weighed 15.7812 grams, representing a loss of 0.3 milligram.

In still another vessel, the urea formaldehyde resin heretofore referred to was added in an amount corresponding to 1 lb. per 100 bbls. of aqueous fluid. In this case the initial test piece weighed 16.7953 grams and at the end of 7 days it weighed 16.7962 grams, representing a gain of .9 milligram in weight. This gain may be accounted for at least partially on the theory that the resin formed a film on the surface of the specimen.

The nature and objects of the present invention having been thus described and illustrated, what is claimed as useful and is desired to be secured by Letters Patent is:

1. A method for inhibiting corrosion of ferrous metal in contact with an aqueous fluid containing hydrogen sulphide which comprises incorporating in the aqueous fluid a urea formaldehyde condensation product which is at least capable of being colloidally suspended in said aqueous fluid, said condensation product being used in a small but sufficient quantity to inhibit said corrosion.

2. A method according to claim 1 in which the urea formaldehyde condensation product is one containing the grouping

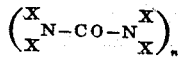

in which at least one X is a methylol group and each of the other X's is one of the group consisting of hydrogen, methylol and methylene and in which $n$ is any whole number.

3. A method according to claim 1 in which the urea formaldehyde condensation product is formed in situ in the aqueous fluid by adding thereto substantially equal parts by weight of urea and formaldehyde.

4. A method according to claim 1 in which the urea formaldehyde condensation product is a solid condensation product.

5. A method according to claim 1 in which the urea formaldehyde condensation product is a monomeric condensation product.

6. A method according to claim 1 in which the urea formaldehyde condensation product is a polymeric condensation product.

7. A method according to claim 1 in which the urea formaldehyde condensation product is added in the amount of about 1 pound per 100 barrels of aqueous fluid.

LESLIE G. NUNN, Jr.

REFERENCES CITED

The following references are of record in the file of this patent:

UNITED STATES PATENTS

| Number | Name | Date |
|---|---|---|
| 1,771,985 | Calcott et al. | Aug. 5, 1930 |
| 2,080,422 | Hoover | May 18, 1937 |
| 2,426,318 | Menaul | Aug. 26, 1947 |

OTHER REFERENCES

Gregory: "The Condensed Chemical Dictionary," 3rd edition, Reinhold Pub. Corp., (1942), page 652.